(12) United States Patent
Ishii

(10) Patent No.: US 6,778,493 B1
(45) Date of Patent: *Aug. 17, 2004

(54) REAL-TIME MEDIA CONTENT SYNCHRONIZATION AND TRANSMISSION IN PACKET NETWORK APPARATUS AND METHOD

(75) Inventor: Atsushi Ishii, Vancouver, WA (US)

(73) Assignee: Sharp Laboratories of America, Inc., Camas, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/499,701

(22) Filed: Feb. 7, 2000

(51) Int. Cl.[7] .......................... H04L 12/26; H04L 12/28
(52) U.S. Cl. ....................... 370/229; 370/231; 370/235; 370/401
(58) Field of Search .................. 370/400, 401, 370/412, 413, 428, 229, 230, 230.1, 231, 232, 235

(56) References Cited

U.S. PATENT DOCUMENTS

| | | | |
|---|---|---|---|
| 4,506,358 A | 3/1985 | Montgomery | 370/409 |
| 4,530,091 A | 7/1985 | Crockett | 370/229 |
| 4,918,687 A | 4/1990 | Bustini et al. | 370/235 |
| 5,432,790 A | 7/1995 | Hluchyj et al. | 370/412 |
| 5,444,709 A | 8/1995 | Riddle | 370/474 |
| 5,450,394 A | 9/1995 | Gruber et al. | 370/253 |
| 5,557,724 A | 9/1996 | Sampat et al. | 725/43 |
| 5,594,660 A | 1/1997 | Sung et al. | 715/500.1 |
| 5,598,352 A | 1/1997 | Rosenau et al. | 715/500.1 |
| 5,623,483 A | 4/1997 | Agrawal et al. | 439/74 |
| 5,629,936 A | 5/1997 | Lee et al. | 370/230 |
| 5,675,573 A | 10/1997 | Karol et al. | 370/230 |

(List continued on next page.)

OTHER PUBLICATIONS

Escobar, Julio et al., *Flow Synchronization Protocol*, IEEE, 1992.
Kouvelas, Isidor et al., *Lip Synchronisation* for use over the Internet: Analysis and Implementatio, *IEEE, 1996*.
Willebeck–Lemair, Marc H.; *Videoconferencing over Packet–based Networks*, IEEE Communications, Vil. 15, No. 6, Aug. 1997.

*Primary Examiner*—John Pezzlo
*Assistant Examiner*—Saba Tsegaye
(74) *Attorney, Agent, or Firm*—Robert D. Varitz, P.C.

(57) ABSTRACT

A system for transmitting and synchronizing real-time multimedia content includes a multimedia server for generating a multimedia packet; a packet-based communication network connected to the multimedia server for receiving multimedia packets therefrom; the network having multiple routers therein to route the multimedia packets to plural destinations; a mechanism for inserting total delay information (TDI) into the multimedia packets, wherein the TDI includes total end-to-end delay (TED) and cumulative network delay (CND); and plural multimedia receivers for receiving the multimedia packets having TDI therein, wherein each multimedia receiver includes a buffer, a sequencing mechanism, and a playing mechanism for playing retrieved, sequenced multimedia packets at time TED after the multimedia packet has been transmitted by the multimedia server. A method of transmitting and synchronizing real-time multimedia content includes loading multimedia audio/visual into plural multimedia packets; inserting total delay information (TDI) into at least one of the multimedia packets, wherein TDI includes total end-to-end delay (TED) and cumulative network delay (CND); transmitting the multimedia packets to plural multimedia receivers over a packet-based network in a play sequence; and playing the multimedia packets at each receiver at time TED.

20 Claims, 3 Drawing Sheets

U.S. PATENT DOCUMENTS

| | | | |
|---|---|---|---|
| 5,682,384 A | 10/1997 | Zarros | 370/374 |
| 5,768,527 A | 6/1998 | Zhu et al. | 709/231 |
| 5,790,522 A * | 8/1998 | Fichou et al. | 370/236 |
| 5,802,060 A | 9/1998 | Fischbach et al. | 370/444 |
| 5,815,634 A | 9/1998 | Daum et al. | 386/96 |
| 5,844,600 A | 12/1998 | Kerr | 348/14.12 |
| 5,874,997 A | 2/1999 | Haigh | 375/240.25 |
| 6,009,077 A * | 12/1999 | Firoiu et al. | 370/230 |
| 6,081,513 A * | 6/2000 | Roy | 370/260 |
| 6,154,463 A * | 11/2000 | Aggarwal et al. | 370/408 |
| 6,212,206 B1 * | 4/2001 | Ketcham | 370/516 |

\* cited by examiner

REAL-TIME MEDIA CONTENT SYNCHRONIZATION AND TRANSMISSION IN PACKET NETWORK APPARATUS AND METHOD

FIELD OF THE INVENTION

This invention relates to multimedia networks, and specifically to the synchronization of multicast distributed media content when played by multiple multimedia devices, e.g., monitors and audio systems.

BACKGROUND OF THE INVENTION

In some situations, such as at conventions and in exhibition halls, it is required to play the same video contents synchronized at multiple video monitors. Generally, it is also required to synchronize audio and video between separately located monitors and speakers. Current real-time media transmission technology allows transferring an audio/video stream over non-guaranteed quality of service (QoS) packet networks with reasonable quality and at a lower cost than provided by higher quality networks. Thus, there will be a demand for playing multimedia contents, delivered to a plurality of receivers over packet network, in synchronized manner.

FIG. 1 depicts a prior art multimedia content delivery system, generally at 10, which uses a packet network. A multimedia server 12 generates a stream of multimedia packets 14 that contain multimedia audio/video contents. Normally, server, or source, 12 generates multimedia packets at a constant rate (packet rate); e.g., one packet every 20 ms. Packet size depends on the multimedia codec, which may result in fixed size or variable sized packets. The generated multimedia packets are then transferred through a packet network 16, having plural routers, or nodes, 18, 20, 22, 24, 26, 28 and 30 therein, and are delivered to a plurality of multimedia receivers, 32, 34, 36 and 38. The mechanism:m for delivery to multiple devices is well known as "multicast." All the receivers that wish to receive multimedia contents from the server join a multicast group. The routers in packet network 16 are aware of the multicast group, and transfer received multimedia packet to multiple routes. Each receiver is equipped with a speaker and/or a video display, and each plays the contents in the received multimedia packet in real-time. The multimedia receivers may buffer received multimedia packets for some duration in order to absorb the variance in delay caused by the network, and to playback multimedia packets in right order.

In conventional packet network, such as an IP network, packets are queued in each router. How long a packet stays in a queue depends on the amount of traffic that a particular router is handling. Hence, each multimedia packet delivered to each multimedia receiver has an unpredictable delay. As a result, the audio/video contents may be played at multiple locations without synchronization.

As previously noted, real-time multimedia transmission technology currently allows transferring an audio/video stream over non-guaranteed quality of service (QoS) packet networks with reasonable quality. As mobile Internet access increases, with its data transfer over bandlimited communication channels, such as wireless data networks, the technology to transmit real-time multimedia packets requiring minimum bandwidth becomes essential and of increases importance.

A packet-based real-time media transmission system is illustrated in FIG. 2, generally at 40. A multimedia source, or server, 42, periodically transmits multimedia packets 44 having audio/video multimedia contents to a packet network 46. In packet network 46, each multimedia packet is routed by a plurality of network nodes, or routers, 48, 50, 52 and 54, and delivered to a receiver 56. Each multimedia packet includes timing information that is used to set timing for playback at a receiver 56. The multiple routers and receivers of FIG. 1 are not shown in FIG. 2 for the sake of clarity.

Packet network 46 causes a: variable length delay in the delivery of each multimedia packet. In addition, network 46 does not guarantee the delivery of the multimedia packets in the same order as transmitted. Thus, a receiver is normally equipped with a buffer to handle delay variances and/or disorders in multimedia packet receipt. However, due to the real-time property of the contents, the receiver will discard a received multimedia packet if the delay in its arrival exceeds a certain value, or if the multimedia packet does not arrive by the time it is to be played.

FIG. 3 shows an example of packets received and played back by the receiver, where each packet contains the timing information. Line I depicts seven multimedia packets transmitted in sequential order by server 42. Line II depicts the order of receipt of the multimedia packets at a receiver. Line III depicts a play order by the receiver. The figure depicts that the multimedia packet with timing information 3 is discarded due to an excessive delay. Basically, the routers in the prior art packet network are not aware of delays in packets transmission and receipt, nor are they aware of disordering of packet transmission. Thus, each router re-directs every received real-time multimedia packet to the next router or the receiver, even if the multimedia packet may not have any chance of being played at the receiver. If a physical link between some two routers, or the physical link between the receiver and the adjacent router has limited bandwidth, the transmission of the multimedia packets which will be discarded at the receiver possibly wastes substantial portion of valuable bandwidth on the link. Delay and disordering is illustrated by the variable routing of multimedia packets from router 48 through router 50, router 52 and router 54, or directly from router 48 to router 54.

U.S. Pat. No. 4,506,358, for Time stamping for a packet switching system, to Montgomery, granted Mar. 19, 1985, describes a method of measuring the network delay in a packet network by including an information field in each packet that indicates the cumulative network delay, time stamping each packet's arrival and re-transmission in each network node, and updating the information field in each network node for each packet by adding the delay occurring in each node, i.e., re-transmission time—arrival time.

U.S. Pat. No. 4,530,091, for Synchronization of real-time clocks in a packet switching system, to Crockett, granted Jul. 16, 1985, describes a means to synchronize a remote real-time clock to a standard real-time clock via an X.25 (CCITT) network, but does not teach or suggest how to synchronize a multimedia stream, and does not consider network delay caused in a packet network.

U.S. Pat. No. 4,918,687 for Digital packet switching networks, to Bustini et al., granted Apr. 17, 1990, describes a method to avoid consecutive packet loss by clipping voice packets whose contents indicate whether the packet is eligible for clipping, if required, in a node queue within the network.

U.S. Pat. No. 5,432,790 for Method for allocating inter-nodal link bandwidth in a packet oriented communication network to guarantee delay quality-of-service, to Hluchyj et al., granted Jul. 11, 1995, describes a method to allocate bandwidth on internodal links such that worst case maximum delays and worst case average delays are guaranteed while providing statistical gains in maintaining predetermined end-to-end delay QoS.

U.S. Pat. No. 5,444,709 for Protocol for transporting real time data, to Riddle, granted Aug. 22, 1995, describes a method to maintain the isochronous nature of the real-time data transmission by discarding data that is not timely received.

U.S. Pat. No. 5,450,394 for Delay monitoring of telecommunication networks, to Gruber et al., granted Sep. 12, 1995, describes a means to measure a round-trip-delay of network transit time, however, the delay which must be known for multimedia transmission and synchronization is a one-way network delay.

U.S. Pat. No. 5,557,724 for User interface, method, and apparatus selecting and playing channels having video, audio, and/or text streams, to Sampat et al., granted Sep. 17, 1996, describes a user interface in a computer system to playback multimedia streams.

U.S. Pat. No. 5,594,660 for Programmable audio-video synchronization method and apparatus for multimedia systems, to Sung et al., granted Jan. 14, 1997, describes a means to playback an audio and video stream synchronously to a single network-based receiver.

U.S. Pat. No. 5,598,352 for Method and apparatus for audio and video synchronizing in MPEG playback systems, to Rosenau et al., granted Jan. 28, 1997, describes a means to playback an audio and video stream synchronously to a single network-based receiver.

U.S. Pat. No. 5,623,483 for Synchronization system for networked multimedia streams, to Agrawal et al., granted Apr. 22, 1997, describes a means for a receiving device to determine the total end-to-end delay from a statistical network delay distribution and the synchronization of the two media streams from different sources through the provision of a synchronization clock located in each server and in each receiver.

U.S. Pat. No. 5,629,936 for Control of consecutive packet loss in a packet buffer, to Lee et al., granted May 13, 1997, describes a method for dropping packets to control consecutive packet loss based on a desired packet gap.

U.S. Pat. No. 5,675,573 for Delay-minimizing system with guaranteed bandwidth delivery for real-time traffic, to Karol et al., granted Oct. 7, 1997, describes a bandwidth allocation mechanism based on individual guaranteed bandwidth requirements associated with each traffic flow.

U.S. Pat. No. 5,682,384 for Apparatus and methods achieving multiparty synchronization for real-time network application, to Zarros, granted Oct. 28, 1997, describes a means to playback contents from multiples sources synchronously to a single receiver on a network.

U.S. Pat. No. 5,768,527 for Device, system and method of real-time multimedia streaming, to Zhu et al., granted Jun. 16, 1998, describes a method to recover lost packets by retransmission.

U.S. Pat. No. 5,802,060 for Data network and a process for real time transmission of data packets in a data network, to Fischbach et al., granted Sep. 1, 1998, describes a method to prioritize packet transmissions for stations whose network access is controlled by token exchanges.

U.S. Pat. No. 5,815,634 for Stream synchronization method and apparatus for MPEG playback system, to Daum et al., granted Sep. 29, 1998, describes a means to playback an audio and video stream synchronously to a single network-based receiver.

U.S. Pat. No. 5,844,600 for Methods, apparatus, and systems for transporting multimedia conference data streams through a transport network, to Kerr, granted Dec. 1, 1998, describes a means for audio/video conferencing over an ATM network. Audio streams are combined in a network-based mixer and distributed to terminals. At each terminal, the received audio and video streams are played synchronously, however, there is no provision for synchronous play at multiple terminals on a network.

U.S. Pat. No. 5,874,997 for Measuring and regulating synchronization of merged video and audio data, to Haigh, granted Feb. 23, 1999, describes a means to playback an audio and video stream synchronously to a single, network-based receiver.

The Internet Engineering Task Force (IETF) publishes requests for comments (RFC) and comments filed in response thereto.

RFC 1889: A real-time end-to-end protocol utilizing existing transport layers for data that has real-time properties.

RFC 2508: Compressing IP/UDP/RTP Headers for Low-Speed Serial Links

RFC 1144: Compressing TCP/IP Headers for Low-Speed Serial Links, Similar to RFC 2508, but for TCP/IP packets.

SUMMARY OF THE INVENTION

A system for transmitting and synchronizing real-time multimedia content includes a multimedia server for generating a multimedia packet having multimedia audio/visual information therein in a play sequence, and for transmitting the multimedia packet; a packet-based communication network connected to the multimedia server for receiving the multimedia packets therefrom; the network having multiple routers therein to route the multimedia packets to plural destinations; means for inserting total delay information (TDI) into the multimedia packets, wherein the TDI includes total end-to-end delay (TED) and cumulative network delay (CND); and plural multimedia receivers for receiving the multimedia packets having TDI therein, wherein each multimedia receiver includes a buffer for storing received multimedia packets, a sequencing means for retrieving stored multimedia packets from the buffer and sequencing the multimedia packets in the play sequence, and a playing mechanism for playing the retrieved, sequenced multimedia packets at time TED after the multimedia packet has been transmitted by the multimedia server. A method of transmitting and synchronizing real-time multimedia content includes loading multimedia audio/visual into plural multimedia packets; inserting total delay information (TDI) into at least one of the multimedia packets; wherein TDI includes total end-to-end delay (TED) and cumulative network delay (CND); transmitting the multimedia packets to plural multimedia receivers over a packet-based network in a play sequence; buffering the multimedia packets in each multimedia receiver; recalling the multimedia packets in play sequence; and playing the multimedia packets at each receiver at time TED.

An object of the invention is to provide synchronized A/V output at a plurality of receivers over and multimedia carrying network.

Another object of the invention is to prevent transmissions of any multimedia packets which will not be used by a receiver on the network.

These and other objects and advantages of the invention will become more fully apparent as the description which follows is read in conjunction with the drawings.

DETAILED DESCRIPTION OF THE PREFERRED EMBODIMENT

Synchronization and transmission of multicast multimedia, particularly over packet-based systems is an efficient and inexpensive techniques for distributing information. Prior art systems simply do not consider the problems associated with synchronizing and transmitting a multimedia data stream, from one or more sources, over a packet-based system, to multiple receivers. Although there exist a number of technologies that enable a plurality of correlated media streams, transmitted from different locations, to be played at single receiver in a synchronized manner, the known prior art does not allow media streams generated by a single source, or multiple sources, to be multicast over a packet-based network to be played synchronously at multiple locations. This invention provides a system and method to transmit and synchronously play the same audio/video stream at the different locations, and to eliminate transmission of a multimedia packet when it is apparent that the multimedia packet will not be played at its destination.

Figure 1:
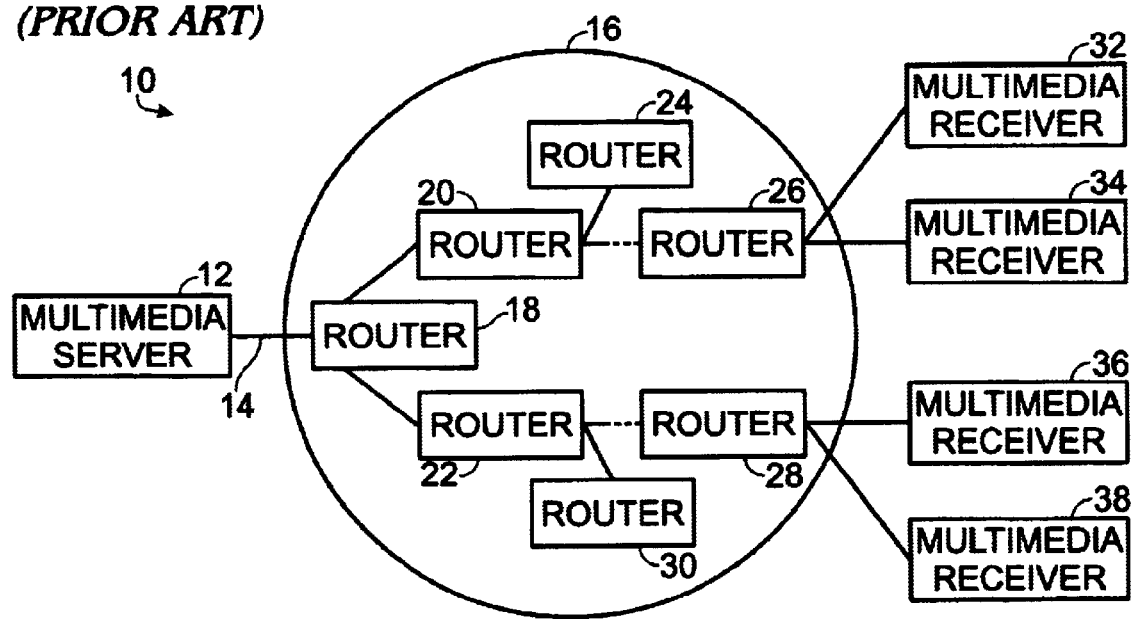
FIG. 1 depicts a prior art multimedia content delivery system.
Figure 2:
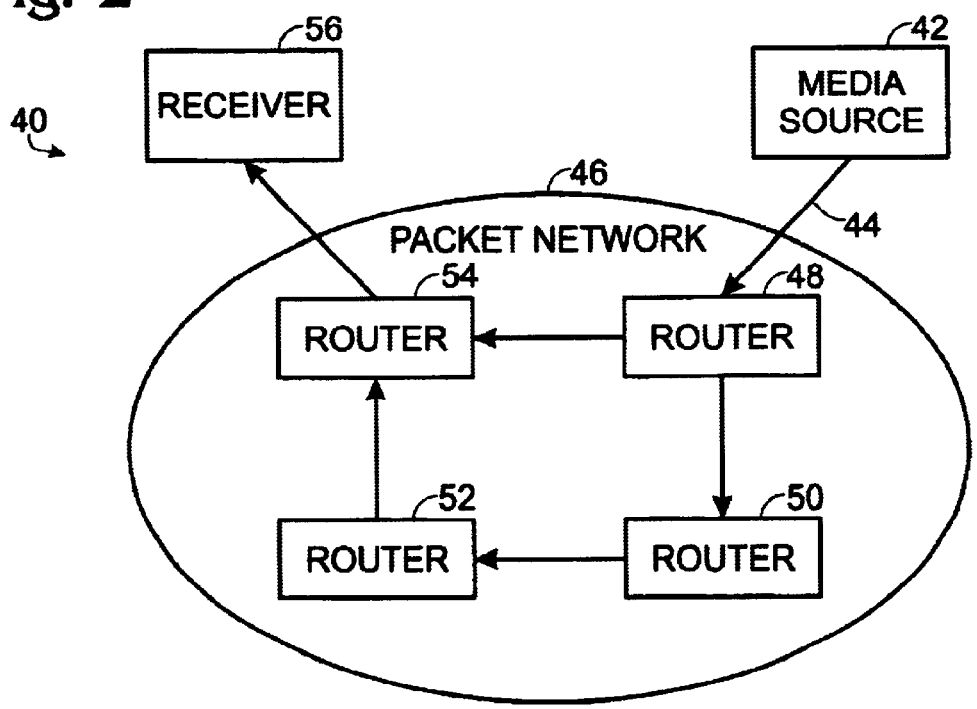
FIG. 2 depicts a packet-based real-time multimedia content transmission system.
Figure 3:
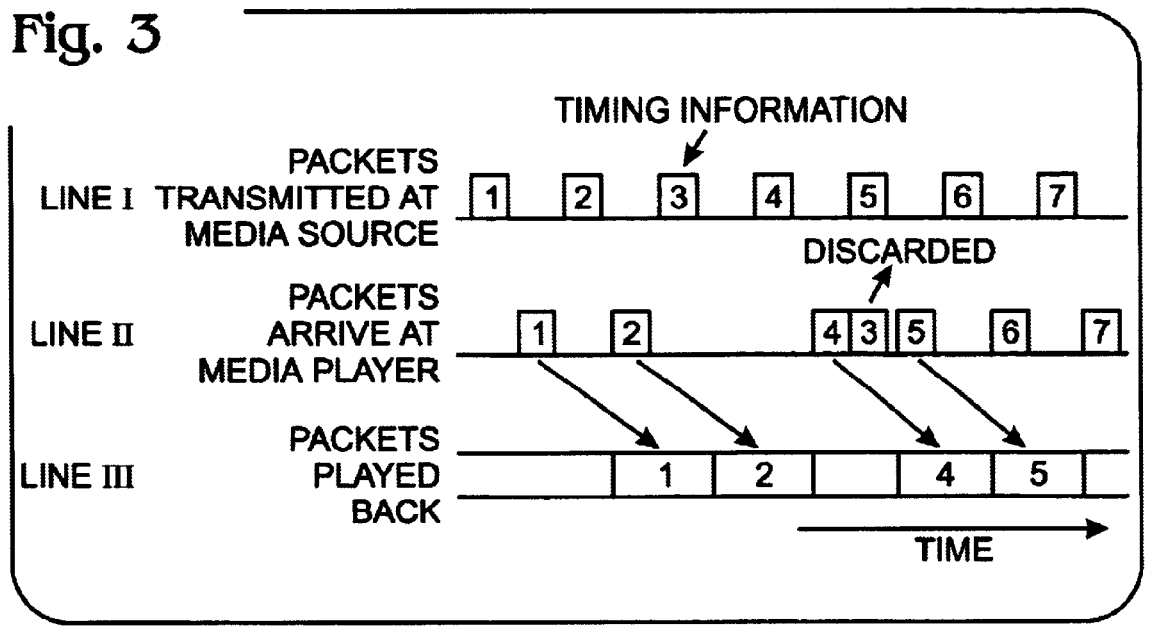
FIG. 3 is a block diagram of packet receipt and playback.
Figure 4:
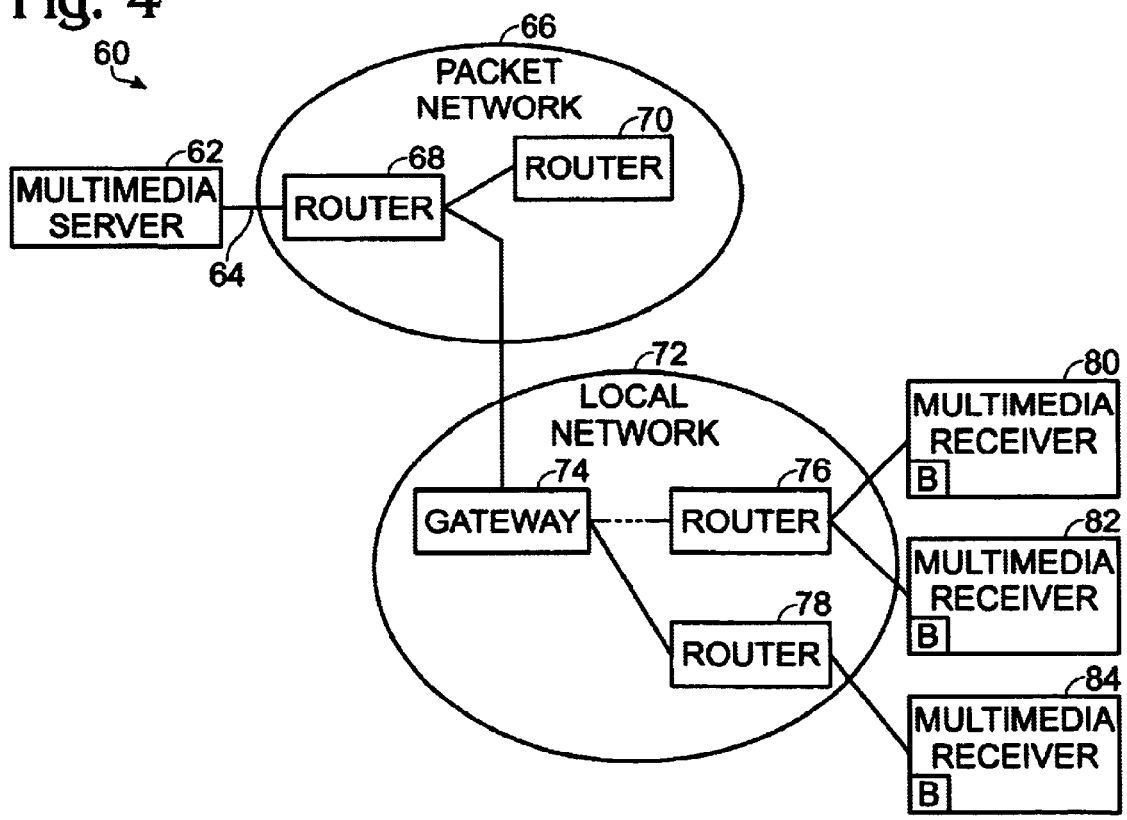
FIG. 4 depicts a LAN multimedia content delivery system constructed according to the invention.

Referring now to FIG. 4, a content synchronized multimedia transmission system constructed according to the invention is depicted generally at 60. System 60 includes a multimedia server 62, which has the means to insert TED and CND information, which is defined and described later herein, into each multimedia packet 64 that passes therethrough. A packet network 66 includes two routers, 68, 70, although many more routers are likely present in such a generalized network. Router 68 is connected to a local area network (LAN) 72, which includes a gateway 74 and routers 76, 78. Multimedia receivers 80, 82 and 84 are connecter to LAN 72.

The method of the invention includes loading multimedia information into a series of packets 64, referred to herein as multimedia packets. Multimedia server 62 inserts fields of total end-to-end delay (TED) and cumulative network delay (CND) in each multimedia packet, referred to herein as total delay information (TDI). TED indicates the time from when the multimedia packet is transmitted from the server to when the multimedia packet is to be played at a receiver, whereas CND indicates the actual latency caused by routers in the communications network before the multimedia packet is delivered to a receiver. Multimedia server 62 determines the value of TED from network statistics. When transmitting a multimedia packet, server 62 sets the value of jitter to CND. The jitter is obtained by $$\text{time interval of transmissions of two consequent packets-packet rate.} \quad (1)$$

For example, if the packet rate is 20 ms and a packet is actually transmitted 30 ms after the previous packet, jitter is 10 ms and the CND of the packet is set to 10 ms.

Each router in the network, regardless of whether the router is located in packet network 66 or LAN 72, measures the queuing delay of each multimedia packet caused by that router. The queuing delay is obtained from time stamps of reception and transmission of the multimedia packet. When transmitting the multimedia packet, each router updates CND by adding the queuing delay to the current CND value. If the router needs to route a received multimedia packet to multiple routes, i.e., multicast, such as router 68 multicasting to router 70 and gateway 74, the multimedia packet is duplicated, and the queuing delay for the duplicated multimedia packet is handled separately from the original. There may be more than one duplicated packet, and the queuing delay is placed in each duplicated packet.

Each multimedia receiver includes a buffer "B" to store incoming multimedia packets, and recalls a multimedia packet from the buffer to play the content of a multimedia packet at (TED-CND) after its reception. Thus, a multimedia packet delivered to the multiple multimedia receivers is played at TED after transmitted at the server, regardless of the actual network delay caused in the route to each receiver.

As described in the previous example, CND contains only a queuing delay, and does not include physical latencies caused by the physical transmission between two routers. The physical latency is assumed to be small and is therefore negligible. Alternatively, a router may be provided with a known physical latency, which may be added to the queuing delay for increased accuracy.

If all the receivers are aware of the packet rate, performing the procedures described above for the first multimedia packet of the media stream- is sufficient, because a receiver receiving a multimedia packet with TED and CND knows when to play the multimedia packets which follow, however, where the first multimedia packet containing TED and CND is "lost," i.e., not received by one or more receivers, the server may be required to include TED and CND in the first several multimedia packets. Alternatively, the server may be required to include TED and CND until it receives an acknowledgement that a multimedia packet having TED and CND has been received by all of the receivers belonging to the multicast group.

As mentioned earlier, multimedia server 62 determines the value of TED, based on network statistics. TED may be provided to the server by a network administrator, or measured dynamically. The actual determination of,T ED is beyond of the scope of this invention, however, U.S. Pat. No. 5,623,483 provides a technique to determine TED from the statistical distribution of network delay. The overall solution of U.S. Pat. No. 5,623,483, however, is that the server and the receivers have synchronized clocks. The server specifies, in each packet, the time at which the receiver is to play the packet content. However, it is unrealistic to expect that the servers and receivers of a packet network maintain precisely the same time on their synchronized clocks.

It is foreseeable that situations may arise where queuing delays and physical latencies add up to the point where a multimedia packet reaches a receiver, and is "late." In the case of prior art systems, audible and visual discontinuities are perceptible to a user, without any means to correct this situation. The system and method of the invention have provisions to function in the case where one of the receivers detects a CND in a multimedia packet which exceeds the TED for the multimedia packet. In this case, the multimedia packet cannot be played synchronously, because the time for play of the contents of the multimedia packet has already passed. The receiver includes means to request a larger TDI, and sends a message to the server with the value CND-TED. The server then increases the value of TED, and thus TDI, for following multimedia packets.

In the embodiment shown in FIG. 4, server 62 and all the routers included in packet network 66 and LAN 72 for the multicast group supports TED and CND. As depicted in FIG. 4, all of the multimedia receivers in the multicast group are in a local area network (LAN), however, a multimedia receiver may also be connected to a router in packet network 66. A multimedia server does not have to include special hardware or software to insert TDI into the multimedia packets, as described above. Instead, a gateway, which connects the LAN to the (public) packet network, generates TDI from TED and CND for multimedia packets received from the server. The gateway must be capable of generating the value of TED, and must be supplied with the packet rate. The routers and the receivers in the LAN may perform the same function. Consequently, the invention may be implemented even if the entire packet network does not support the method presented here. Put another way, the means for inserting TDI may be provided by a multimedia server, a router, or a gateway.

Figure 5:
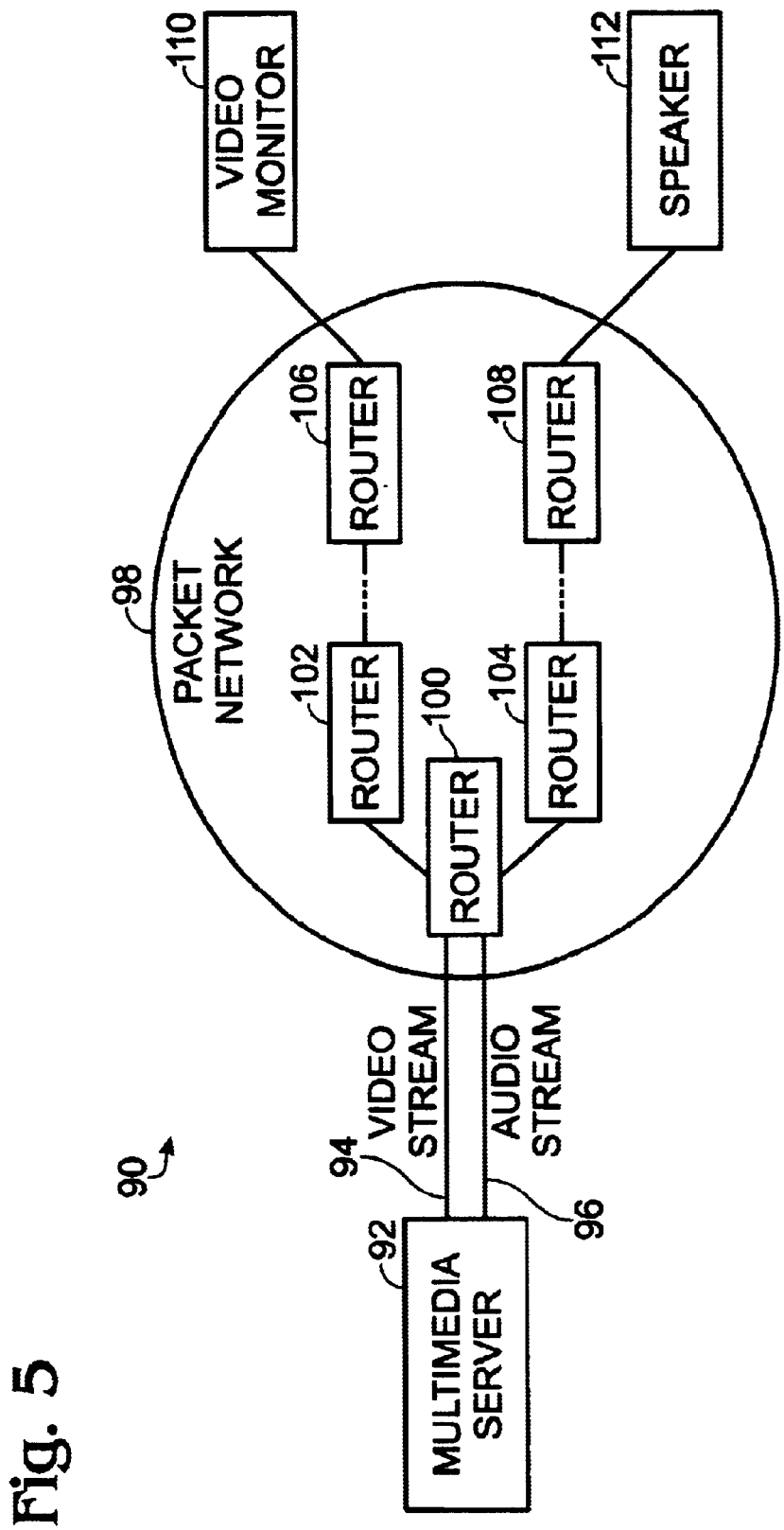
FIG. 5 depicts a multimedia content delivery system wherein the video and audio streams are separately routed.

Another embodiment, illustrated in FIG. 5, generally at 90, includes a multimedia server 92, which generates a video stream 94 and an audio stream 96, a packet network 98, having routers 100, 102, 104, 106 and 108, and a video monitor 110 and a speaker 112. Video stream 94 and audio stream 96 are to be played separately yet synchronously at video monitor 110 and at speaker 112, respectively, which are connected to packet network 98. The destination addresses of video packets and audio packets are the addresses for the video monitor and for the speaker, respectively. Server 92 includes means to insert TDI, including TED and CND, in both video and audio packets. The routers perform the same procedure as shown in the other embodiments.

The method of U.S. Pat. No. 4,506,358 is different from the invention described herein in that the present invention employs an information field in each packet of a type neither taught nor suggested in the prior art, that indicates the time when the audio/video content in the packet should he played. This enables the same content to be played synchronously at multiple receivers, without the necessity of synchronized server/receiver clocks.

This invention also maximizes the efficiency of bandwidth on physical links among routers and receivers by preventing a router from transmitting multimedia packets that will not be played at the final destination, i.e., a media player, or receiver, as in the case where CND>TED.

Non-viable multimedia packets may be discarded if it is determined that they are not needed, or if it is determined that they will not be used. The following may be used as a stand-alone technique, or in conjunction with the synchronization technique previously described herein. A router places a time stamp and sequence number in every received multimedia packet transferred between the media source and the receiver. Let:

$t_{ts}[n]$: the time stamp of the multimedia packet with sequence number n, and $t_p[n]$: the timing information included in the multimedia packet with sequence number n, indicating when the content in this multimedia packet is to be played at the receiver. This information provides relative timing information among series of multimedia packets and does not indicate the absolute time.

At the receipt of the first multimedia packet, having sequence number=$n_0$, the router stores $t_{ts}[n_0]$ and $t_p[n_0]$ in memory and re-directs the multimedia packet to the next router or the receiver. Now, let $$T_{ts}=t_{ts}[n_0] \text{ and} \qquad (2)$$

$$T_p=t_p[n_0]. \qquad (3)$$

At the receipt of every following received multimedia packet with sequence number n, the router examines the values of $t_{ts}[n]$ and $t_p[n]$, and, if $$t_{ts}[n]-T_{ts}<t_p[n]-T_p+D, \qquad (4)$$

where D denotes the maximum TED allowance, including the buffering delay in the receiver, the router re-directs the multimedia packet and sets $$T_{ts}=t_{ts}[n] \text{ and} \qquad (5)$$

$$T_p=t_p[n]; \qquad (6)$$

and determines that the multimedia packet is a viable packet. Otherwise, the router discards the multimedia packet.

The value $t_{ts}[n]-T_{ts}$ is the difference between the arrival time of the multimedia packet of interest and the latest successfully re-directed multimedia packet at the router. Similarly, $t_p[n]-T_p$ indicates the time interval at play back between these two multimedia packets. Thus, if $$t_{ts}[n]-T_{ts}>t_p[n]-T_p+D, \qquad (7)$$

the multimedia packet with sequence number n has already consumed the entire TED allowance. In this case, there is no chance for the multimedia packet to be played at the receiver, because the multimedia packet will not arrive at the receiver before or at the time it is to be played. By eliminating unnecessary transmission of such a multimedia packet, referred to herein as a non-viable packet, the bandwidth on the physical link between this router and the next entity, regardless of whether the next entity is a router or a receiver, may be utilized efficiently. The router thus includes means to determine whether a multimedia packet is a viable multimedia packet, in which case the multimedia packet is transmitted; or whether the multimedia packet is a non-viable multimedia packet, in which case the multimedia packet is discarded.

The value of D at any router may be provided by: (1) being hard-coded on the node's software or hardware; (2) being manually configured by a system administrator; or (3) being provided in every real-time multimedia packet by the multimedia server. The value is determined by the required QoS and must be greater than the buffering delay in the receiver. D will be a small value for delay-sensitive applications, such as two-way voice conversation. The receiver may negotiate the value-of D with the media source using common communication protocols.

The transmission method of the invention functions with IP/UDP/RTP header compressor, specified in RFC 2508, wherein the header information of real-time multimedia packets is compressed by a differential coding scheme. The compressor, which may be implemented in a transmitting portion of a router, provides a means to identify a specific real-time media stream between a media source and a receiver, among other traffic. Because of differential coding, the compressor is required to examine the timing information in the header of real-time multimedia packets in any packet-based network, and the extra processing power required to implement the method of the invention is minimal.

Thus, a system and method for transmitting and synchronizing real-time, multimedia packet-based content over a packet-based network has been disclosed. Although several variations of the system and method of the invention have been disclosed, it will be appreciated that further variations and modification may be made thereto without departing from the scope of the invention as defined in the appended claims.

I claim:

1. A system for transmitting and synchronizing real-time multimedia content to plural, multimedia receivers, comprising:

a multimedia server for generating a multimedia packet having multimedia audio/visual information therein in a play sequence, and for transmitting said multimedia packet;

a packet-based communication network connected to said multimedia server for receiving said multimedia packets therefrom; said network having multiple routers therein to route said multimedia packets to plural destinations;

means for inserting total delay information (TDI) into said multimedia packets, wherein said TDI includes total end-to-end delay (TED) and cumulative network delay (CND), wherein TED is the total time from when a multimedia packet is transmitted from the multimedia server to when the multimedia packet is to be played at a receiver and wherein CND is the actual delay caused as a multimedia packet transits the communications network; and plural multimedia receivers for receiving said multimedia packets having TDI therein, wherein each multimedia receiver includes a buffer for storing-received multimedia packets, a sequencing means for retrieving stored multimedia packets from said buffer and sequencing said multimedia packets in said play sequence for providing a real-time synchronization of the multimedia packets at plural, multimedia receivers, and a playing mechanism for playing the retrieved, sequenced multimedia packets at time TED after said multimedia packet has been transmitted by said multimedia server.

2. The system of claim 1 wherein said means for inserting is located in said multimedia server.

3. The system of claim 1 wherein said means for inserting is located in a router.

4. The system of claim 1 which further includes a local area network (LAN) located between said packet-based network and at least some of said multimedia receivers, wherein said LAN includes a gateway.

5. The system of claim 4 wherein said means for inserting is located in said gateway.

6. The system of claim 1 wherein at least one of said routers includes duplication means for duplicating multimedia packets, wherein said means for inserting is located in said router, and wherein said router inserts TDI into each duplicated multimedia packet.

7. The system of claim 1 which further includes means to determine whether a multimedia packet is a viable packet or whether a multimedia packet is a non-viable packet, and wherein said non-viable packets are discarded.

8. The system of claim 1 wherein said multimedia receivers includes means to request a larger TDI from said means for inserting.

9. A method of transmitting and synchronizing real-time multimedia content to plural, multimedia receivers, comprising:

loading multimedia audio/visual into plural multimedia packets;

inserting total delay information (TDI) into at least one of the multimedia packets, wherein TDI includes total end-to-end delay (TED) and cumulative network delay (CND), wherein TED is the total time from when a multimedia packet is transmitted from a multimedia server to when the multimedia packet is to be played at a receiver and wherein CND is the actual delay caused as a multimedia packet transits a packet-based network;

transmitting the multimedia packets to plural multimedia receivers over a packet-based network in a play sequence;

synchronizing, in real-time, the multimedia packets;

buffering the multimedia packets in each multimedia receiver;

recalling the multimedia packets in play sequence;

increasing the value of TED if CND>TED; and playing the multimedia packets at each receiver at time TED.

10. The method of claim 9 wherein said inserting includes inserting TDI in a multimedia server.

11. The method of claim 9 wherein said inserting includes inserting TDI in a router located in the packer-based network.

12. The method of claim 9 wherein said inserting includes inserting TDI in a gateway located in a local area network (LAN) which is located between the packet-based network and a multimedia receiver.

13. The method of claim 9 which includes duplicating a multimedia packet for multicasting to plural multimedia receivers, and wherein said duplicating includes inserting TDI into at some of the duplicated multimedia packets.

14. The method of claim 9 which includes determining whether a multimedia packet is a viable packet or a non-viable packet, and which further include discarding any non-viable packets where CND>TED, and the value of TED cannot be increased to render the packet viable.

15. A method of transmitting and synchronizing real-time multimedia content to plural, multimedia receivers, comprising:

determining whether a multimedia packet is a viable packet or a non-viable packet;

inserting total delay information (TDI) into at least one of the multimedia packets, wherein TDI includes total end-to-end delay (TED) and cumulative network delay (CND) for synchronizing, in real-time, the multimedia packets, wherein TED is the total time from when a multimedia packet is transmitted from the multimedia server to when the multimedia packet is to be played at a receiver and wherein CND is the actual delay caused as a multimedia packet transits the communications network;

increasing the value of TED if CND>TED; and discarding any non-viable packets.

16. The method of claim 15 which further includes:

loading multimedia audio/visual into plural multimedia packets;

transmitting the multimedia packets to plural multimedia receivers over a packet-based network in a play sequence;

discarding a multimedia packet if at any time during said transmitting CND>TED buffering the multimedia packets in each multimedia receiver;

recalling the multimedia packets in play sequence; and playing the multimedia packets at each receiver at time TED.

17. The method of claim 16 wherein said inserting includes inserting TDI in a multimedia server.

18. The method of claim 16 wherein said inserting includes inserting TDI in a router located in the packet-based network.

19. The method of claim 16 wherein said inserting includes inserting TDI in a gateway located in a local area network (LAN) which is located between the packet-based network and a multimedia receiver.

20. The method of claim 16 which includes duplicating a multimedia packet for multicasting to plural multimedia receivers, and wherein said duplicating includes inserting TDI into at some of the duplicated multimedia packets.

* * * * *